United States Patent
Farinola et al.

(10) Patent No.: US 11,067,257 B2
(45) Date of Patent: Jul. 20, 2021

(54) LIGHTING DEVICE PROVIDED WITH A REFLECTOR ELEMENT

(71) Applicant: TE Connectivity Italia Distribution S.r.l., Collegno (IT)

(72) Inventors: Marcello Farinola, Rivoli (IT); Arianna Spolverato, Turin (IT); Claudia Cezza, Turin (IT); Alessandro Genta, Alpignano (IT); Cinzia Alferi, Turin (IT)

(73) Assignee: TE Connectivity Italia Distribution S.r.l., Collegno (IT)

( * ) Notice: Subject to any disclaimer, the term of this patent is extended or adjusted under 35 U.S.C. 154(b) by 0 days.

(21) Appl. No.: 16/937,105

(22) Filed: Jul. 23, 2020

(65) Prior Publication Data
US 2021/0025569 A1   Jan. 28, 2021

(30) Foreign Application Priority Data

Jul. 25, 2019   (IT) .......................... 102019000012951

(51) Int. Cl.
*F21V 19/00* (2006.01)
*B60K 35/00* (2006.01)
(Continued)

(52) U.S. Cl.
CPC .......... *F21V 19/0045* (2013.01); *B60K 35/00* (2013.01); *B60L 50/64* (2019.02);
(Continued)

(58) Field of Classification Search
CPC ......... H02J 7/0047; G01D 11/28; G01D 5/28; F21V 5/007; F21V 7/0083; F21V 7/04;
(Continued)

(56) References Cited

U.S. PATENT DOCUMENTS 5,130,761 A    7/1992  Tanaka
6,045,233 A *  4/2000  Iwai et al.
(Continued)

FOREIGN PATENT DOCUMENTS

CN    105365576 A    3/2016

OTHER PUBLICATIONS

Italian Search Report, dated Mar. 16, 2020, 20 pages.

*Primary Examiner* — Alan B Cariaso
(74) *Attorney, Agent, or Firm* — Barley Snyder

(57) ABSTRACT

A lighting device uses a plurality of lighting sources. The lighting device includes a printed circuit board having a main side on which the lighting sources are arranged side by side, the lighting sources are oriented so as to project an emitted light radiation in a direction perpendicular to the main side, a first support body supporting the printed circuit board in a horizontal direction, a second support body rigidly connected to the first support body to form a single casing, and a reflector element rigidly connected by a plurality of connecting members to the second support body. The reflector element has a plurality of reflective surfaces arranged side by side. Each of the reflective surfaces faces towards one of a plurality of channel-shaped portions of the second support body and directs the emitted light radiation to one of a plurality of lenses at ends of the channel-shaped portions.

24 Claims, 16 Drawing Sheets

(51) Int. Cl.
- *F21V 7/04* (2006.01)
- *F21V 23/06* (2006.01)
- *H02J 7/00* (2006.01)
- *B60L 50/64* (2019.01)
- *B60L 58/12* (2019.01)
- *F21V 17/10* (2006.01)
- *F21Y 115/10* (2016.01)
- *F21V 23/04* (2006.01)

(52) U.S. Cl.
CPC ............... *B60L 58/12* (2019.02); *F21V 7/04* (2013.01); *F21V 17/104* (2013.01); *F21V 23/06* (2013.01); *H02J 7/0047* (2013.01); *B60K 2370/169* (2019.05); *B60K 2370/33* (2019.05); *F21V 23/04* (2013.01); *F21Y 2115/10* (2016.08)

(58) Field of Classification Search
CPC ... F21V 7/05; F21V 7/09; F21V 13/04; F21V 19/004; F21V 19/0045; F21V 23/04; F21V 17/104; F21V 17/16; F21V 17/18; B60K 2370/169; B60K 2370/33; B60K 2370/332; B60K 2370/336; B60L 58/12; B60L 50/64

See application file for complete search history.

(56) References Cited

U.S. PATENT DOCUMENTS

| | | | |
|---|---|---|---|
| 6,644,841 | B2 | 11/2003 | Martineau |
| 7,344,296 | B2 * | 3/2008 | Matsui et al. |
| 7,521,726 | B2 | 4/2009 | Dahl et al. |
| 9,240,109 | B2 * | 1/2016 | Pasotti et al. |
| 9,568,171 | B1 * | 2/2017 | Grider et al. |
| 10,556,508 | B2 * | 2/2020 | Boron et al. |
| 2006/0012990 | A1 * | 1/2006 | Walser et al. |
| 2010/0110677 | A1 * | 5/2010 | Stein |
| 2012/0081898 | A1 | 4/2012 | Cave et al. |
| 2015/0015202 | A1 * | 1/2015 | Im et al. |
| 2016/0233706 | A1 | 8/2016 | Woo |

\* cited by examiner

LIGHTING DEVICE PROVIDED WITH A REFLECTOR ELEMENT

CROSS-REFERENCE TO RELATED APPLICATION

This application claims the benefit of the filing date under 35 U.S.C. § 119(a)-(d) of Italian Patent Application No. 102019000012951, filed on Jul. 25, 2019.

FIELD OF THE INVENTION

The present invention relates to a lighting device using electrically powered lighting sources and, more particularly, to a lighting device using solid-state lighting sources such as LED sources.

BACKGROUND

In the sector of lighting devices, such as LED lighting modules, one of the most important requirements to meet is that of implementing the various components with minimal dimensions and overall bulk, since in most cases the space available for the final installation of the device is very limited. Devices including a printed circuit board (PCB), on which electrically powered light radiation sources are distributed, oriented so as to project the emitted light radiation in a direction perpendicular to the principal plane of the printed circuit board, have already been proposed in the past. The present invention is based on the desire to overcome some drawbacks resulting from the use of a lighting device having such a configuration.

SUMMARY

A lighting device uses a plurality of lighting sources. The lighting device includes a printed circuit board having a main side on which the lighting sources are arranged side by side, the lighting sources are oriented so as to project an emitted light radiation in a direction perpendicular to the main side, a first support body supporting the printed circuit board in a horizontal direction, a second support body rigidly connected to the first support body to form a single casing, and a reflector element rigidly connected by a plurality of connecting members to the second support body. The reflector element has a plurality of reflective surfaces arranged side by side. Each of the reflective surfaces faces towards one of a plurality of channel-shaped portions of the second support body and directs the emitted light radiation to one of a plurality of lenses at ends of the channel-shaped portions.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
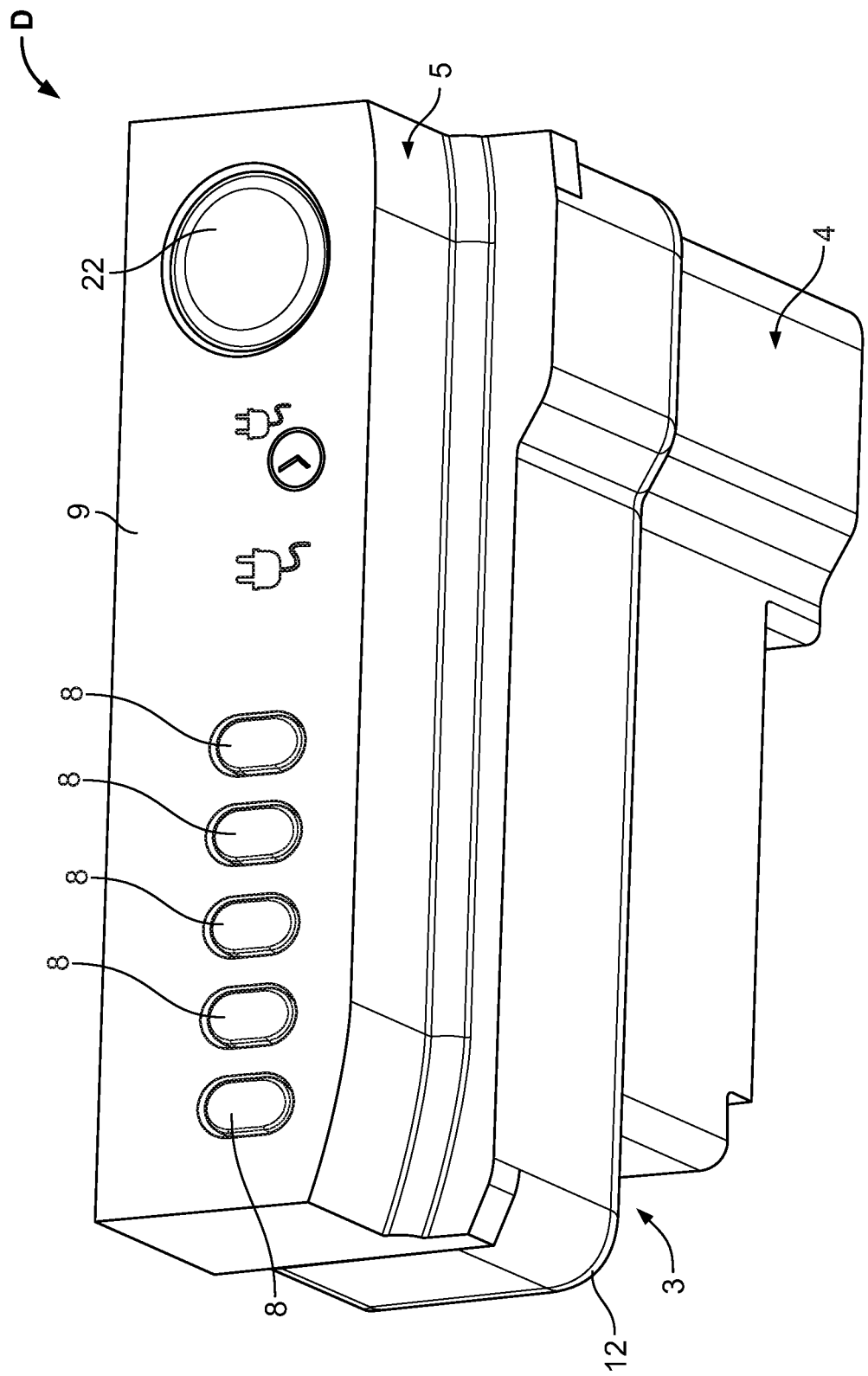
FIG. 1 is a perspective view of a lighting device according to an embodiment.

The following description illustrates various specific details aimed at a deeper understanding of examples of one or more embodiments. The embodiments may be implemented without one or more of the specific details, or using other methods, components, materials, etc. In other cases, known structures, materials or operations are not shown or described in detail, to avoid obscuring various aspects of the embodiments.

The reference to an "embodiment" in the context of this description is intended to indicate that a particular configuration, structure or feature described in relation to the embodiment is included in at least one embodiment. Thus, phrases such as "in an embodiment", which may occur at various points in the present description, do not necessarily refer to the same embodiment. Moreover, particular shapes, structures or features may be combined appropriately in one or more embodiments and/or combined with the embodiments in a different way from what is illustrated herein, and so for example a feature exemplified herein in relation to one drawing may be applied to one or more embodiments exemplified in a different drawing.

The references illustrated herein are merely for convenience, and thus do not limit the scope of protection or the scope of the embodiments.

A lighting device D according to various embodiments using electrically powered lighting sources 1 is shown in FIGS. 1-4. The lighting device D may for example be implemented in the form of an LED lighting module, using solid-state light radiation sources such as LED sources. As is also stated later in the present description, one example of an end application for the device according to the invention is implementing a device for indicating a charge state of a battery pack mounted on board a motor vehicle powered by an electric motor. Naturally, the type of end application specified above should not be considered in any way limiting, since the end applications for a lighting device in accordance with the present invention may be highly varied.

As shown in FIGS. 1-4, the lighting device D comprises a casing 3, having a substantially quadrangular shape and formed for example of polymer material (polycarbonate). Inside the casing 3, a printed circuit board 2 is arranged, which defines a main side 20 on which there are positioned side by side a plurality of lighting sources 1, for example solid-state light radiation sources, such as LED sources which emit colored light. The casing 3 has one or more input ports for corresponding electrical connectors and a power button 22.

Figure 3:
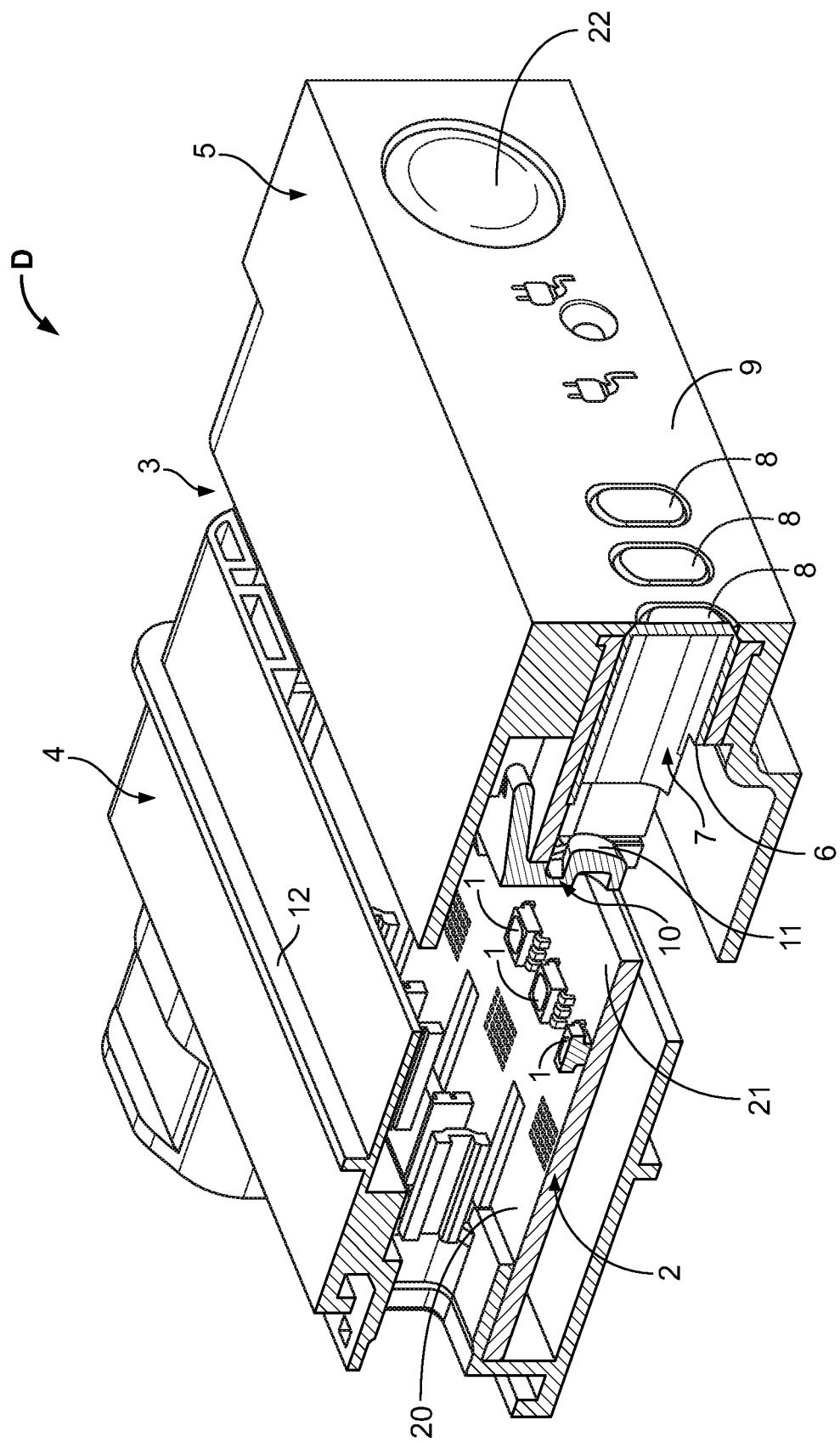
FIG. 3 is a sectional perspective exploded view of the lighting device.

As is shown in FIG. 3, which is a sectional perspective view of an embodiment of the device D in a partially exploded configuration, the lighting sources 1 are oriented so as to project their light radiation away from the main side 20 of the printed circuit board 2, in a direction perpendicular to the principal plane of the printed circuit board 2.

Figure 2:
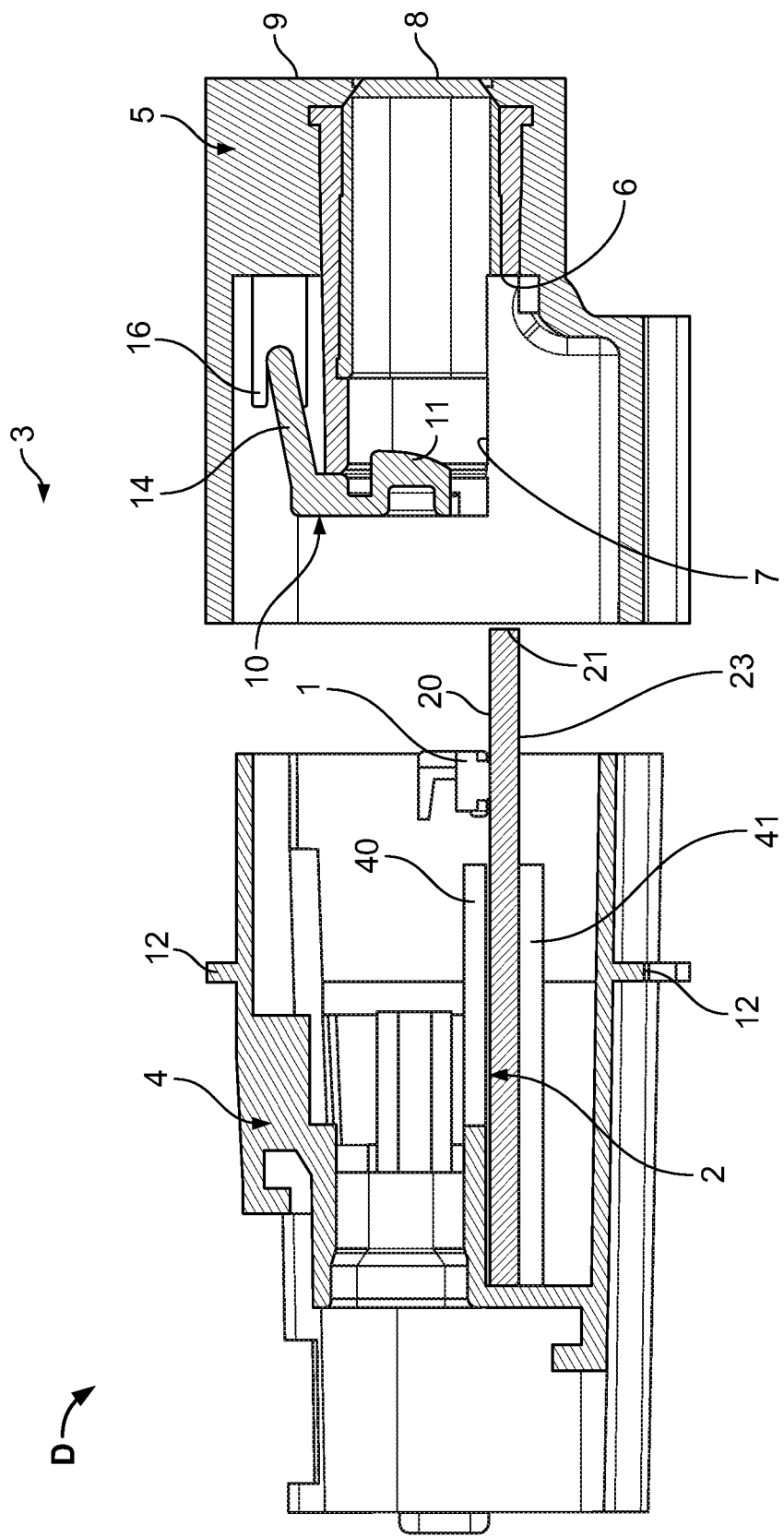
FIG. 2 is a sectional side exploded view of the lighting device.
Figure 4:
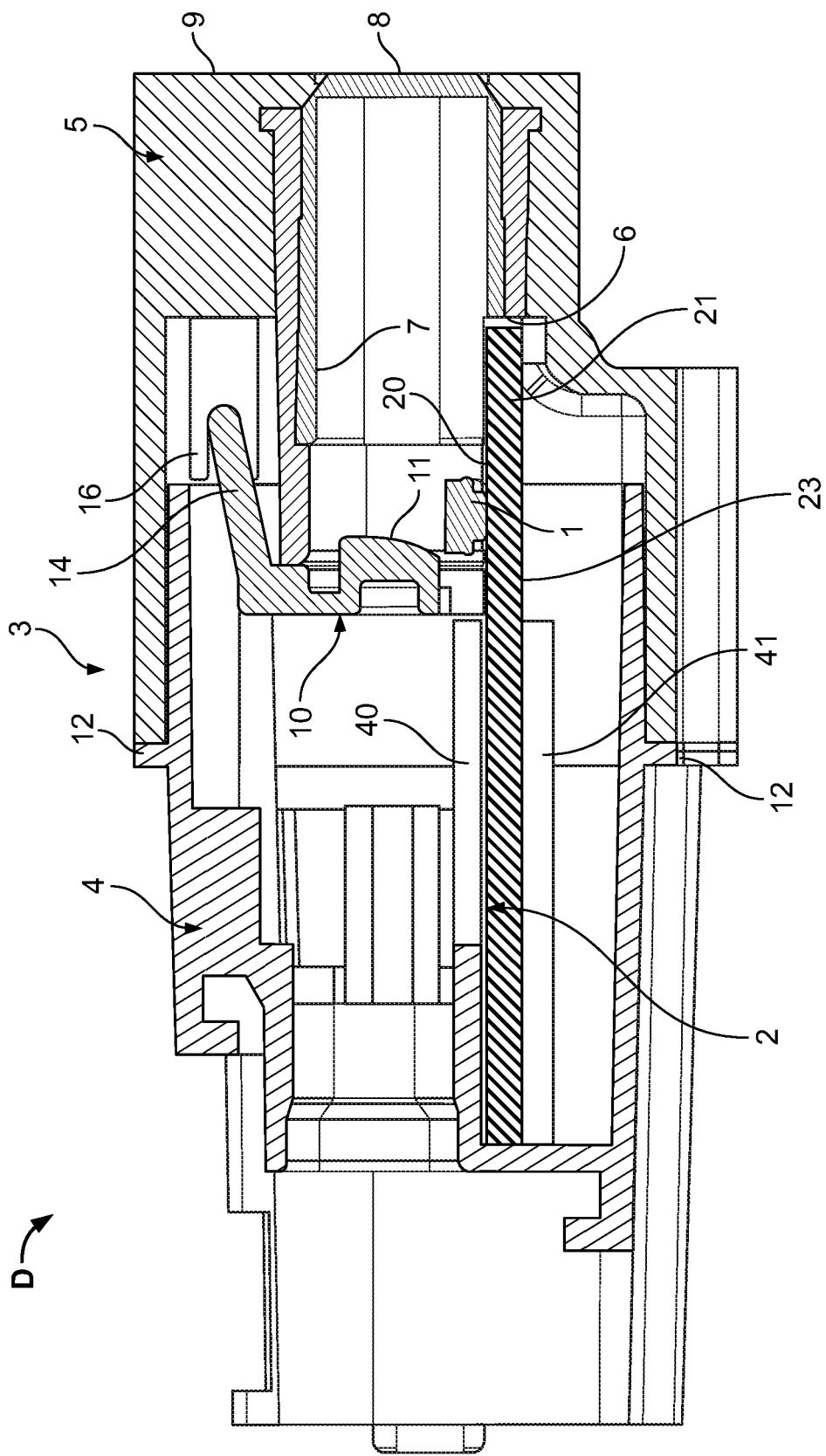
FIG. 4 is a sectional side view of the lighting device in an assembled state.

As is shown FIGS. 2-4, the casing 3 of the device D is defined by a first support body 4, configured to support the printed circuit board 2 in a horizontal direction, and a second support body 5 which, in a mounted configuration, is rigidly connected to the first support body 4 so as to form the casing 3 specified above. In an embodiment, the first support body 4 and the second support body 5 are rigidly interconnected by a laser-welding process. More particularly, the first support body 4 has a thickened part 12 protruding from the external walls of the first support body 4, in a direction perpendicular to these walls, and set up to be joined to a corresponding front surface of the second support body 5 so as to form a single hollow casing 3, in the interior of which all the components of the device D are arranged. Naturally, the casing 3 may be formed using other construction techniques and materials which differ from what is specified above, without departing from the scope of the present invention as a result.

As stated above and shown in FIGS. 2-4, the printed circuit board 2 on which the lighting sources 1 are arranged is supported in a horizontal direction by the first support body 4. More particularly, the board 2 is fixed on the guides 40, 41 within the support body 4, in such a way that the main side 20 of the board 2 is in contact with the guide 40 while the secondary side 23 of the board 2 is in contact with the guide 41, as shown in FIG. 2.

The second support body 5 has, in an interior thereof, a seat 6 set up to receive an end 21 of the printed circuit board 2, as shown in FIGS. 2-4, in such a way that, in the mounted configuration of the device D, the lighting sources 1 mounted on the board 2 come to be arranged within the second support body 5.

Figure 10:
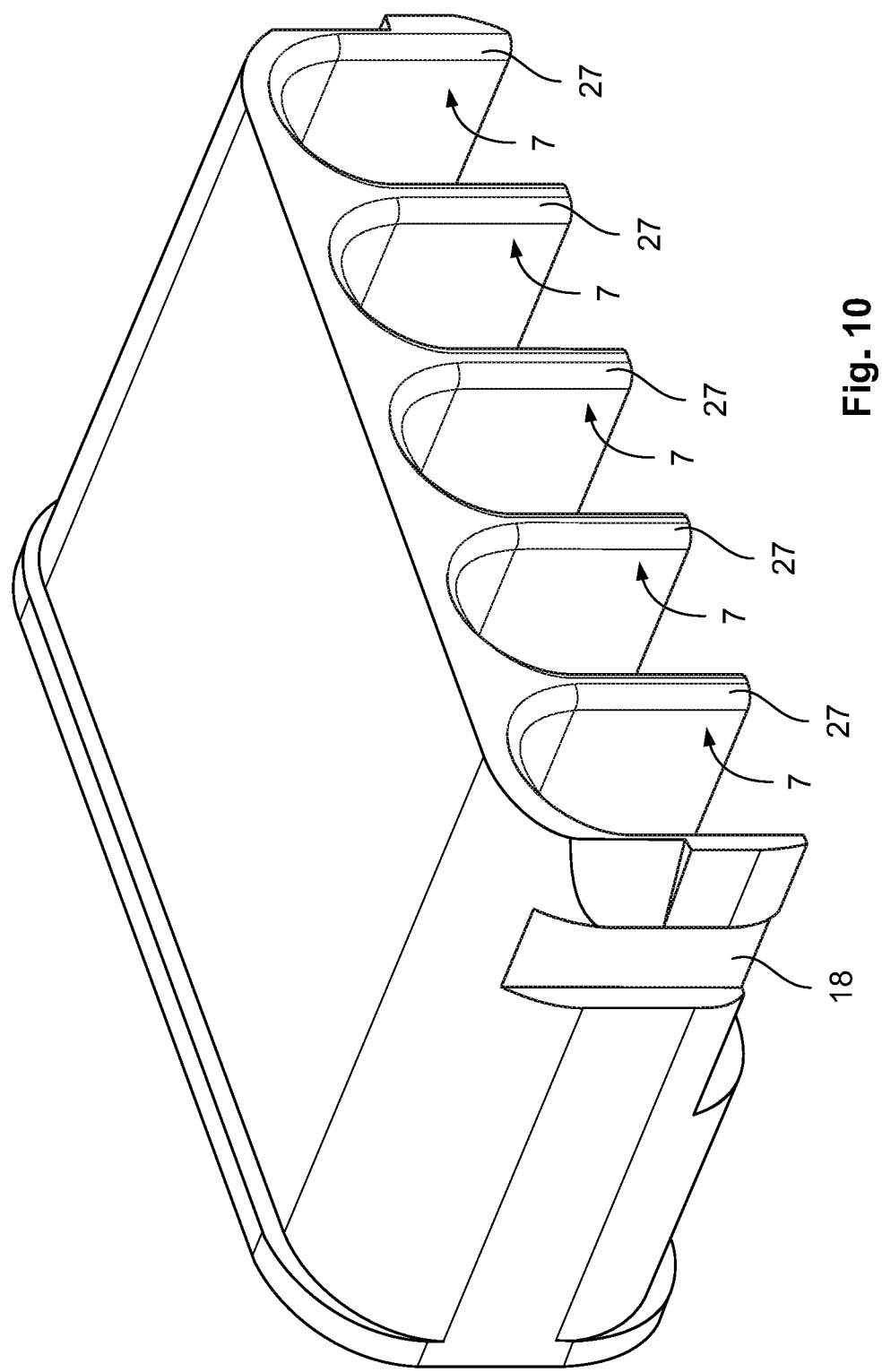
FIG. 10 is a perspective view of a part of the lighting device.

As is shown in particular in FIGS. 3, 4 and 10, the second support body 5 has a plurality of channel-shaped portions 7 arranged side by side and configured to receive in the interior thereof a corresponding lighting source 1 mounted on the printed circuit board 2. The channel-shaped portions 7 extend in a direction substantially parallel to the horizontal direction in which the printed circuit board 2 is supported.

Each channel-shaped portion 7 has a first end 70, as shown in FIGS. 2-4, 6, and 7, which is open and faces towards the first support body 4, and a second, opposite end defined by a lens 8 which is set up to emit the light radiation generated by the corresponding lighting source 1 arranged within one of the channel-shaped portions 7. From the above, it is thus clear how, at an external wall 9 of the casing 3, a plurality of lenses 8 are arranged side by side in an aligned series and each lighting source 1, contained in a corresponding channel-shaped portion 7, is associated with a corresponding lens 8, shown in FIGS. 1 and 3.

The lenses 8 may be formed of transparent polycarbonate, so as to bring about optimum emission of the light radiation emitted from the corresponding lighting sources 1. Moreover, the internal walls of the channel-shaped portions 7 may also be covered in the same material, so as to be able to convey the light of the lighting sources 1 to the corresponding lens 8.

Figure 5:
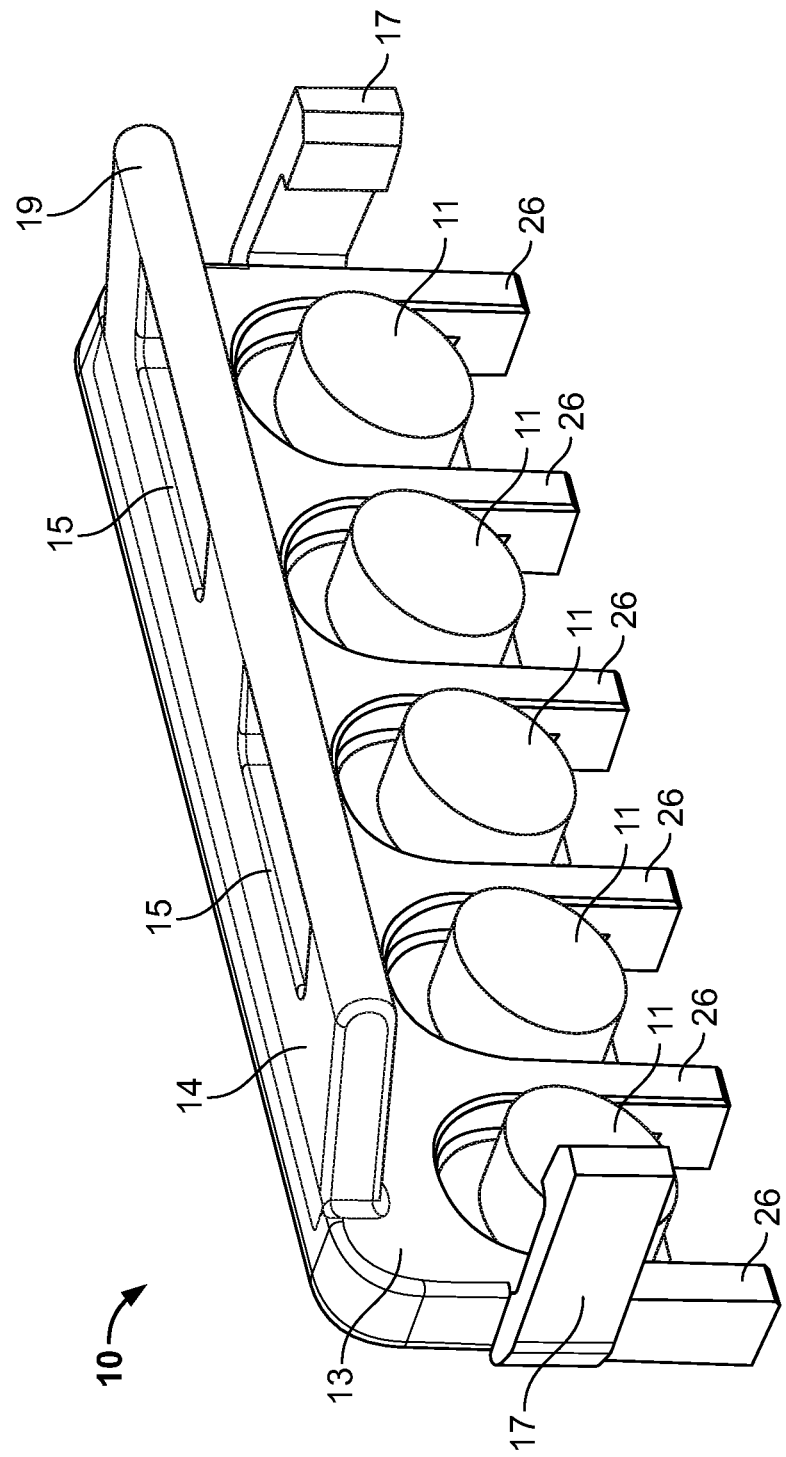
FIG. 5 is a perspective view of a reflector element according to an embodiment.

As stated above, the lighting sources 1 are oriented so as to project the light radiation thereof away from the main side 20 of the printed circuit board 2, in a direction perpendicular to the principal plane of the printed circuit board 2. This orientation is necessitated by the spaces provided for installing the sources 1 and by the type of sources with which the device is to be implemented (for example LEDs which emit colored light). The lighting device D, as shown in FIGS. 2-9, has a reflector element 10 configured to direct and to improve the homogeneity of the light rays emitted from the lighting sources 1 onto the corresponding lenses 8. The accompanying drawings show various example embodiments of the reflector element 10 which defines a principal plane of reflection 13 (FIG. 5, 12, 13). In the case of the invention, the reflector element 10 is rigidly connected by connecting members to the second support body 5, so that, in the mounted state, it comes to be arranged transversely along the first ends 70 of the channel-shaped portions 7 and directed perpendicular to the principal plane of the printed circuit board 2 and to the principal direction of the channel-shaped portions 7.

The principal plane of reflection 13, as shown in FIGS. 2-7, has a plurality of reflective surfaces 11 arranged side by side, which in the mounted state specified above each face towards a corresponding channel-shaped portion 7, and thus towards a single source of light radiation 1 and the corresponding lens 8. In an embodiment, the reflector element 10 is formed, separate from the printed circuit board 2, as a single component which acts on the light radiation emitted from all the lighting sources 1.

As will be described in greater detail in the following, the reflective surfaces 11 are shaped so as to be configured to direct and to improve the homogeneity of the light rays emitted from a light source 1 onto the corresponding lens 8. The reflector element 10 may be formed in a single piece of plastics material (for example polycarbonate) which is white in color, in order to maximize the effectiveness of its reflective properties.

Figure 11:
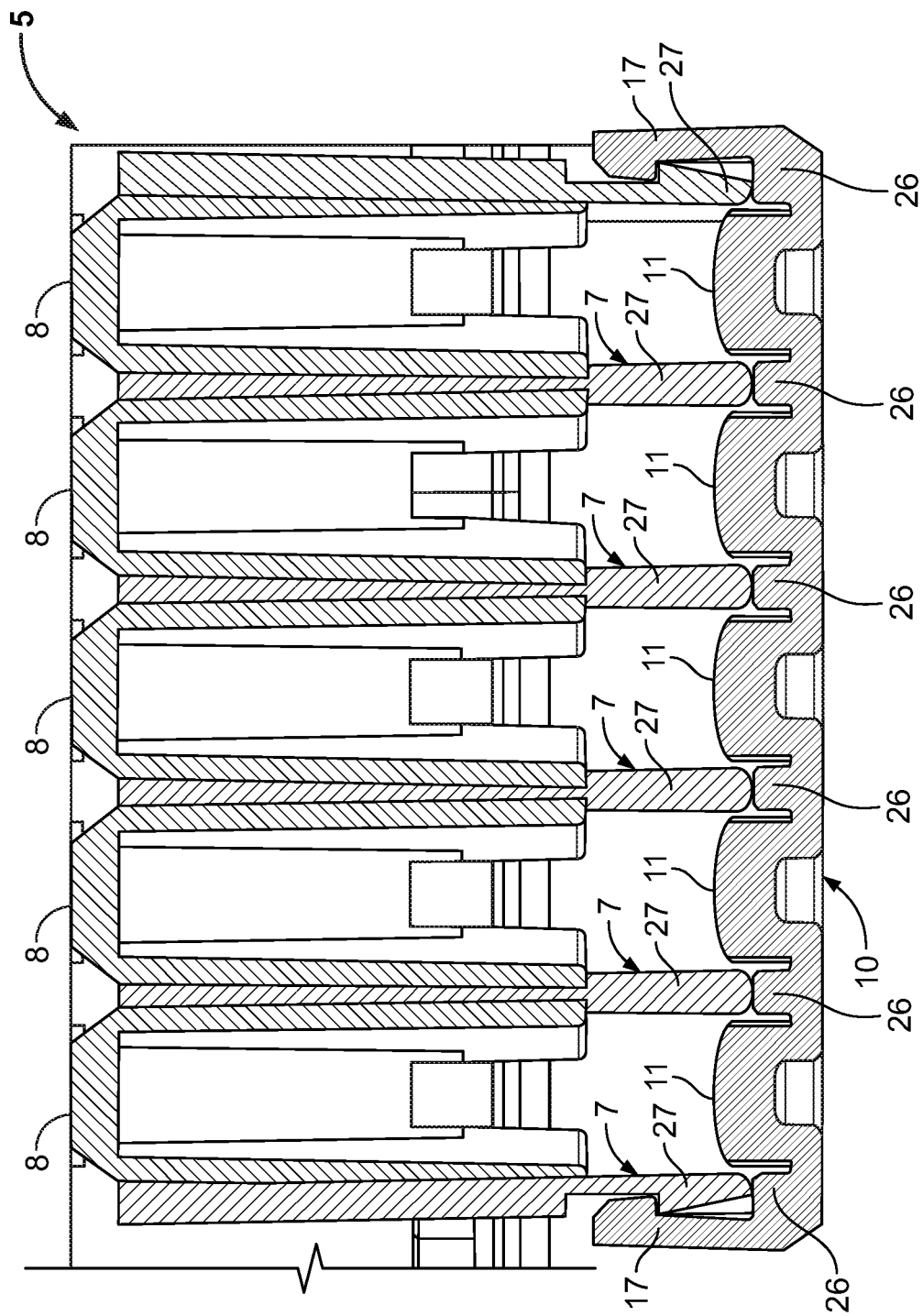
FIG. 11 is a sectional top view of the reflector element in the second assembly step.
Figure 12:
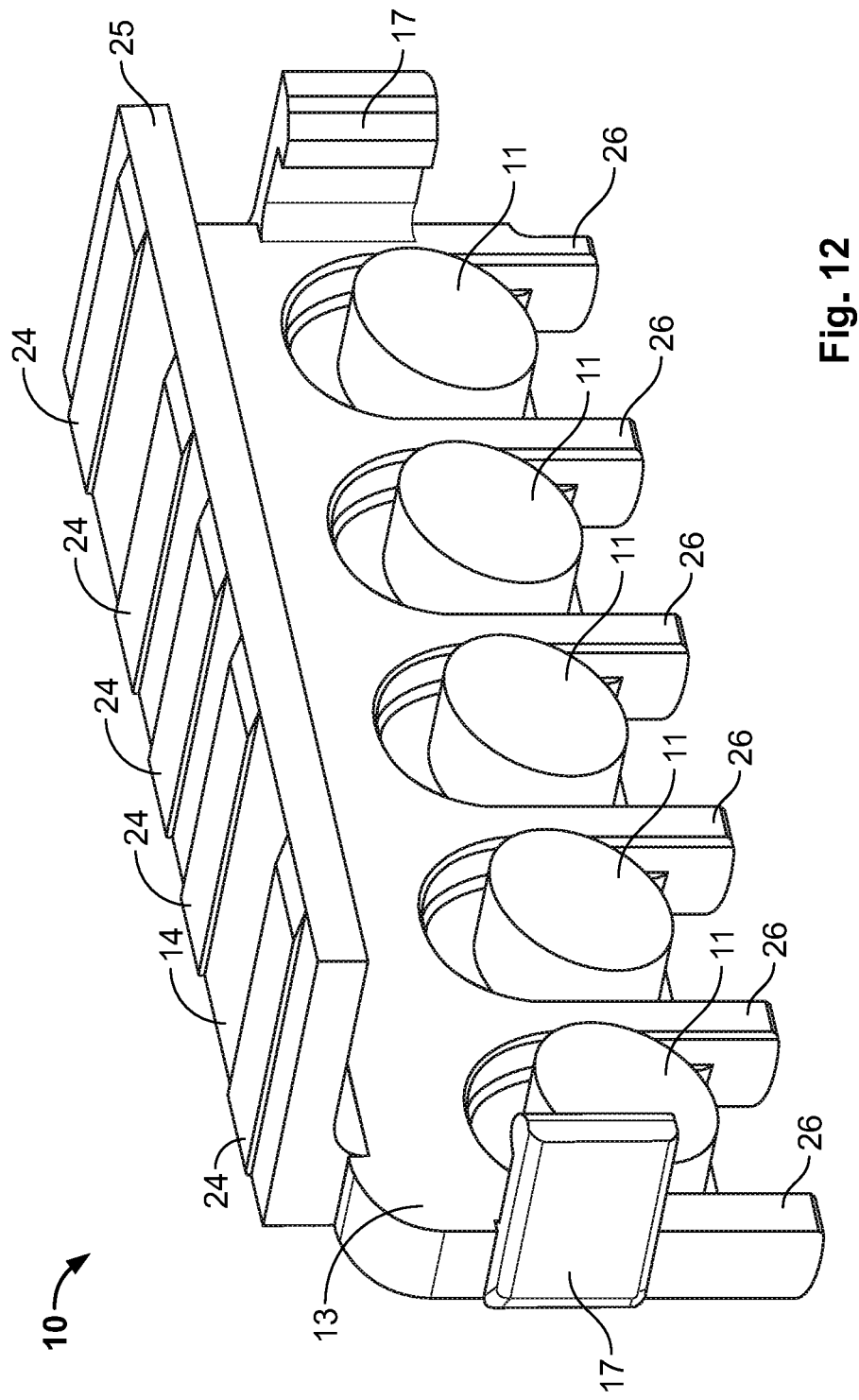
FIG. 12 is a perspective view of a reflector element according to another embodiment.

In an embodiment, the series of reflective surfaces 11 arranged on the principal plane of reflection 13 of the reflector element 10 are separated along the principal plane 13 by a plurality of partition walls 26, as shown in FIGS. 5 and 12. The partition walls 26 are configured to be arranged, in the mounted state of the device D, in abutment against corresponding dividing walls 27 of the channel-shaped portions 7, as shown in FIGS. 10 and 11. As a result of this feature, the light radiation emitted from a single lighting source 1 arranged within one of the channel-shaped portions 7 does not interfere with the light radiation emitted from another lighting source 1 arranged within a channel-shaped portion 7 adjacent to the preceding one. In this way, the light radiations emitted from the single sources 1 are propagated highly effectively along the respective channel-shaped portions 7 and towards the corresponding lenses 8, without thereby making the structure of the device particularly complex.

As stated above, the reflector element 10 is rigidly connected by connecting members to the second support body 5. Below in the present description, some specific embodiments of said connecting members will now be explained in detail. Of course, in one or more embodiments, it is possible to use different connecting members from what is illustrated in the drawings and described in the following.

In an embodiment shown in FIGS. 4-11, the reflector element 10 has an upper portion 14 which protrudes in a direction substantially perpendicular to the principal plane of reflection 13. In the upper portion 14, a pair of openings 15 are formed, which are intended to be engaged with a corresponding hook portion 16 set up on the second support body 5. The hook portion 16 is arranged in an upper position with respect to the channel-shaped portions 7, in such a way that the reflector element 10, in the mounted state, comes to hang from the second support body 5 and covers the first ends 70 of the channel-shaped portions 7 with its principal plane of reflection 13, which carries the reflective surfaces 11, as shown in FIGS. 6-9.

Figure 7:
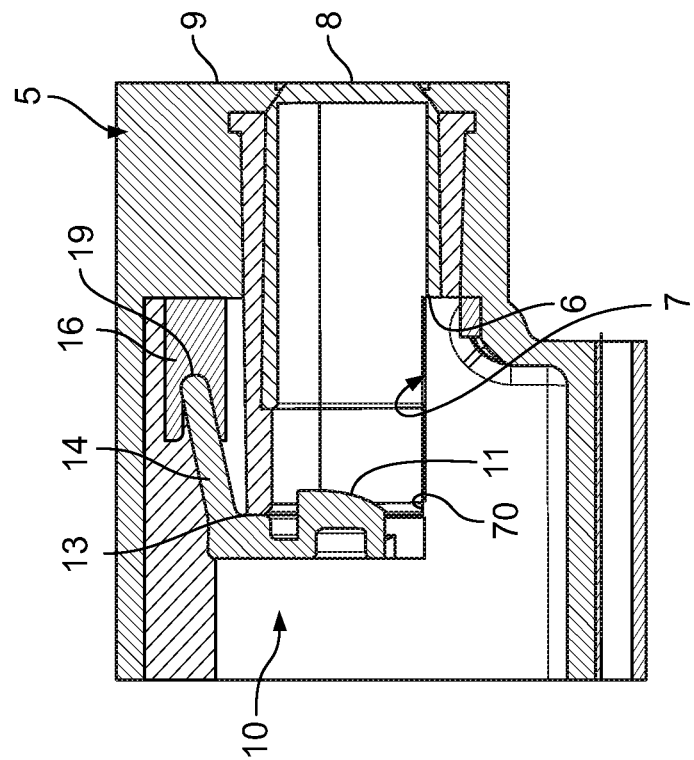
FIG. 7 is a sectional side view of the reflector element in a second assembly step.
Figure 6:
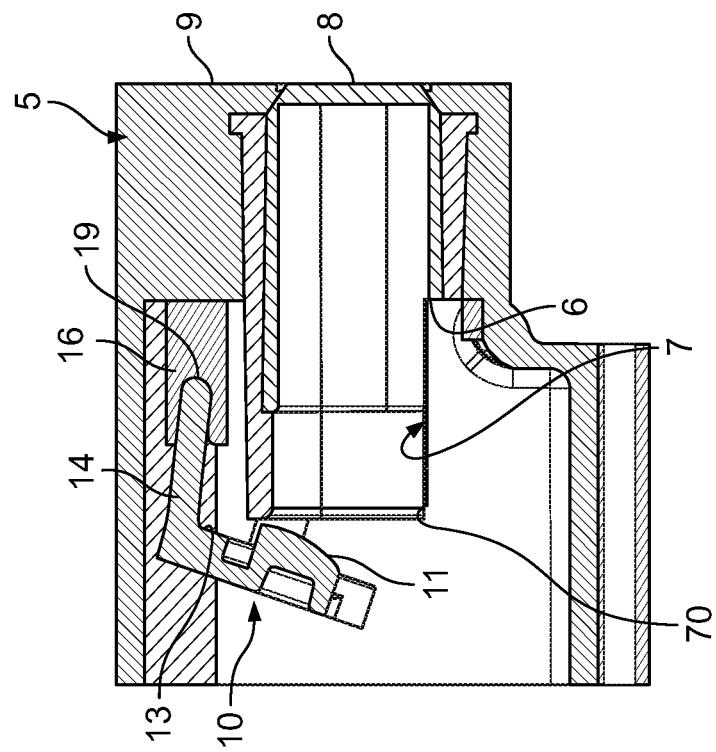
FIG. 6 is a sectional side view of the reflector element in a first assembly step.
Figure 8:
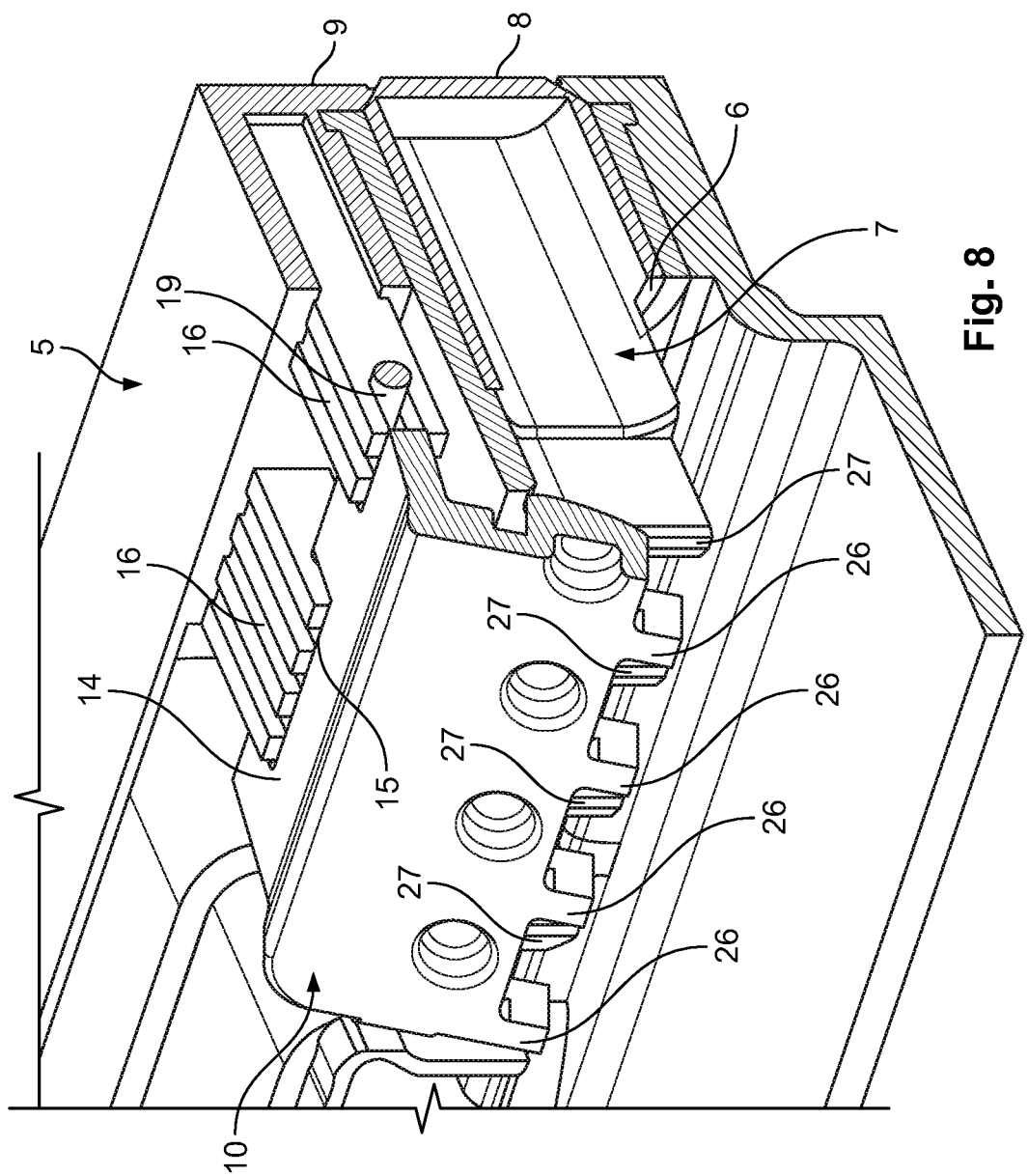
FIG. 8 is a sectional perspective view of the reflector element in the first assembly step.

As shown in FIGS. 5-7, the upper portion 14 of the reflector element 10 has a rounded end edge 19, in such a way that when the upper portion 14 is hooked to the hook portions 16 the reflector element 10 can rotate from a raised position into a position in abutment against the ends 70 of the channel-shaped portions 7.

Figure 9:
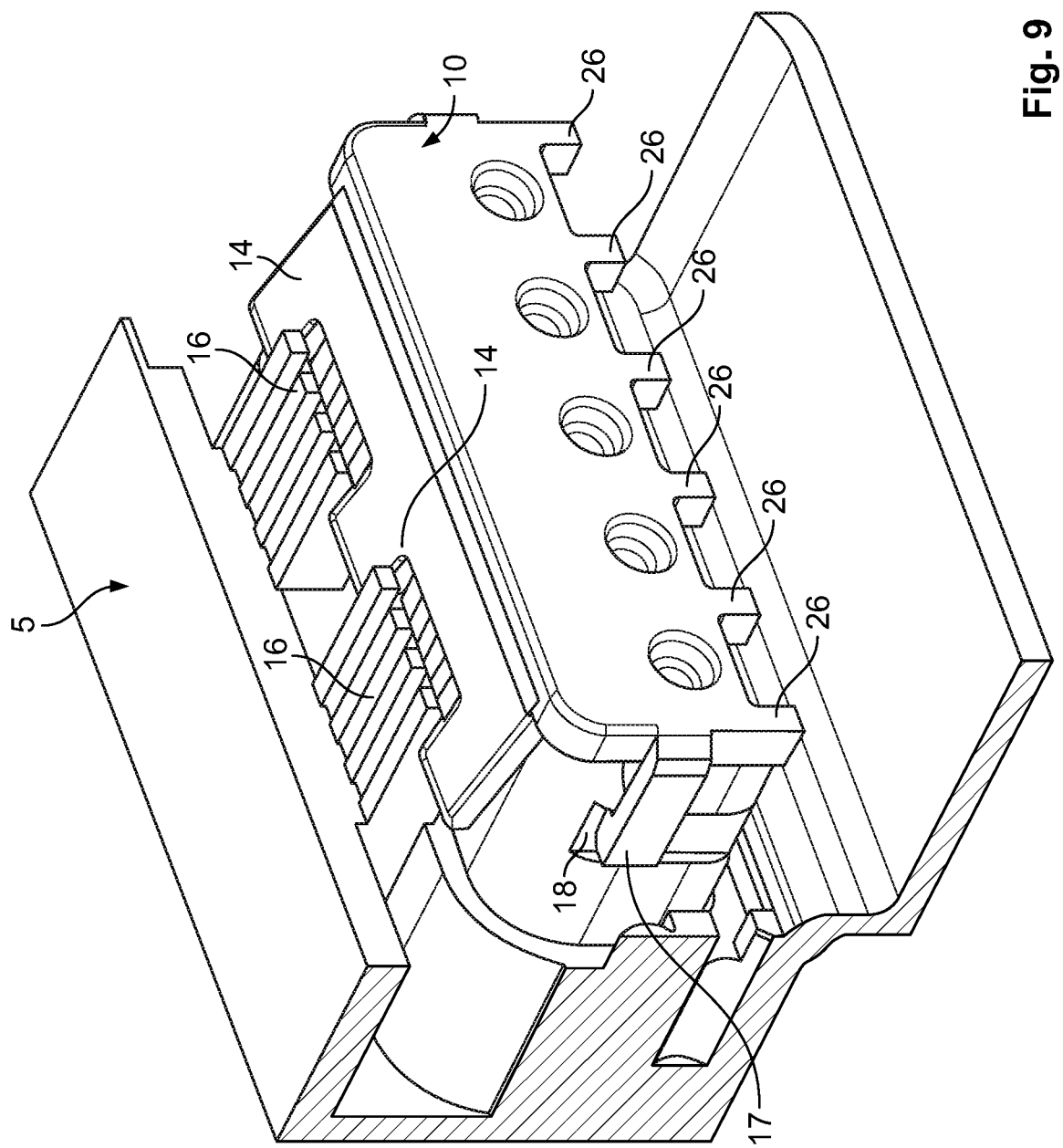
FIG. 9 is a sectional perspective view of the reflector element in the second assembly step.

Moreover, as shown in FIGS. 5, 9, and 10, so as to fix the reflector element 10 stably on the second support body 5, the aforementioned connecting members further include two lateral hooks 17 arranged on the sides of the principal plane 13 of the reflector element 10, which are set up for coupling within corresponding lateral seats 18 arranged on the external sides of the series of channel-shaped portions 7 of the second support element 5.

In a second embodiment shown in FIG. 12, the reflector element 10 includes, as in the embodiment described previously, an upper portion 14 which protrudes from the principal plane of reflection 13 in a direction substantially perpendicular thereto. The upper portion 14 has, at the upper surface thereof, a series of ribs 24 set up for mounting the upper portion 14 of the reflective element 10 in an interference fit within a corresponding hook portion 16 formed on the second support body 5. Analogously to the embodiment described previously, the hook portion 16 of the second support body 5 is arranged in an upper position with respect to the channel-shaped portions 7, in such a way that the reflector element 10 is mounted substantially in a transverse direction along the holes 70 in the channel-shaped portions 7. Unlike the embodiment described previously, in which the reflector element 10 can rotate from a raised position to a lowered position, the upper portion 14 of the reflector element 10 has a substantially flat end edge 25. In this case too, analogously to the embodiment described previously, the connecting members include the two lateral hooks 17 arranged on the sides of the principal plane 13 of the reflector element 10, which are set up for coupling within corresponding lateral seats 18 arranged on the external sides of the series of channel-shaped portions 7 of the second support element 5.

Figure 13:
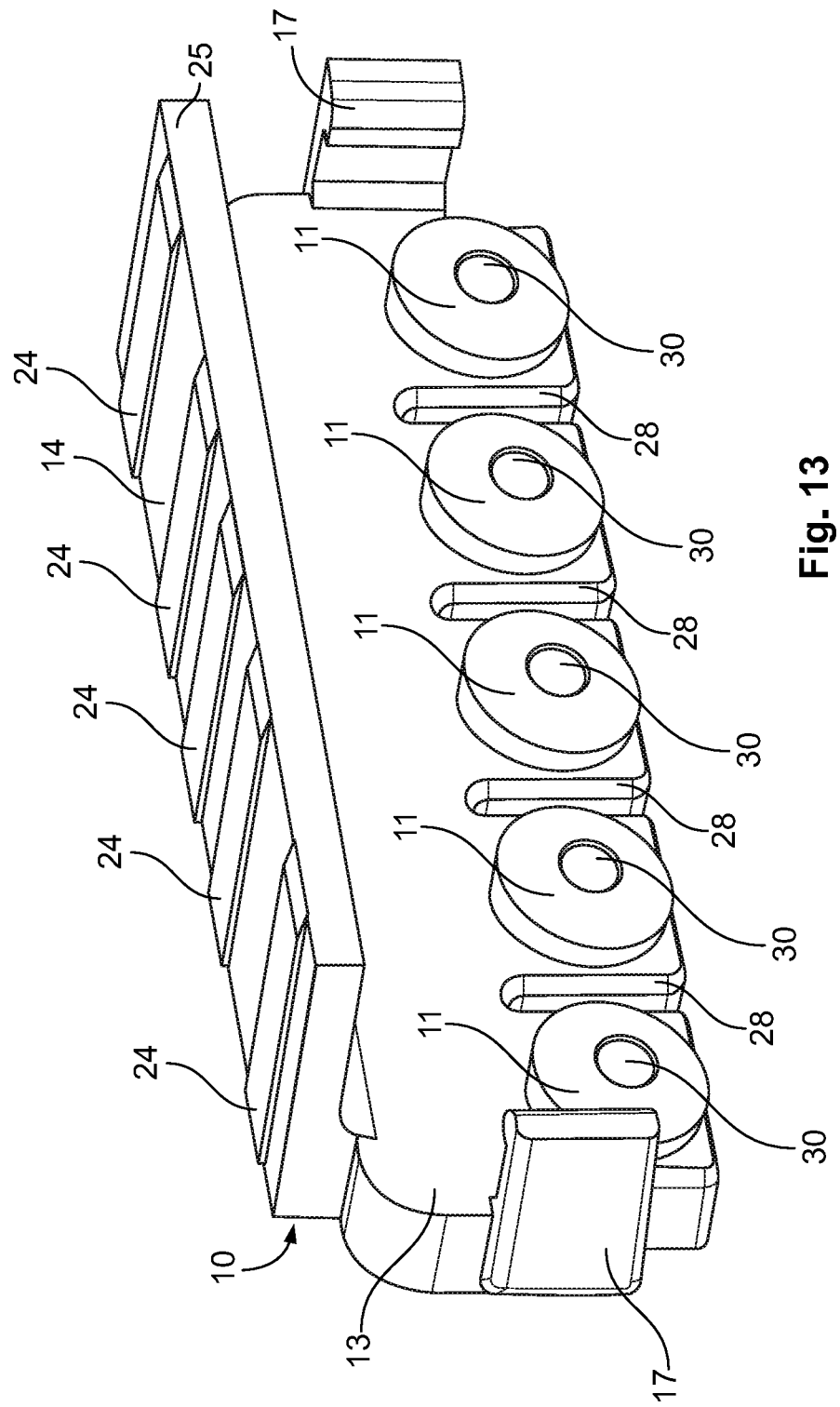
FIG. 13 is a perspective view of a reflector element according to another embodiment.
Figure 14:
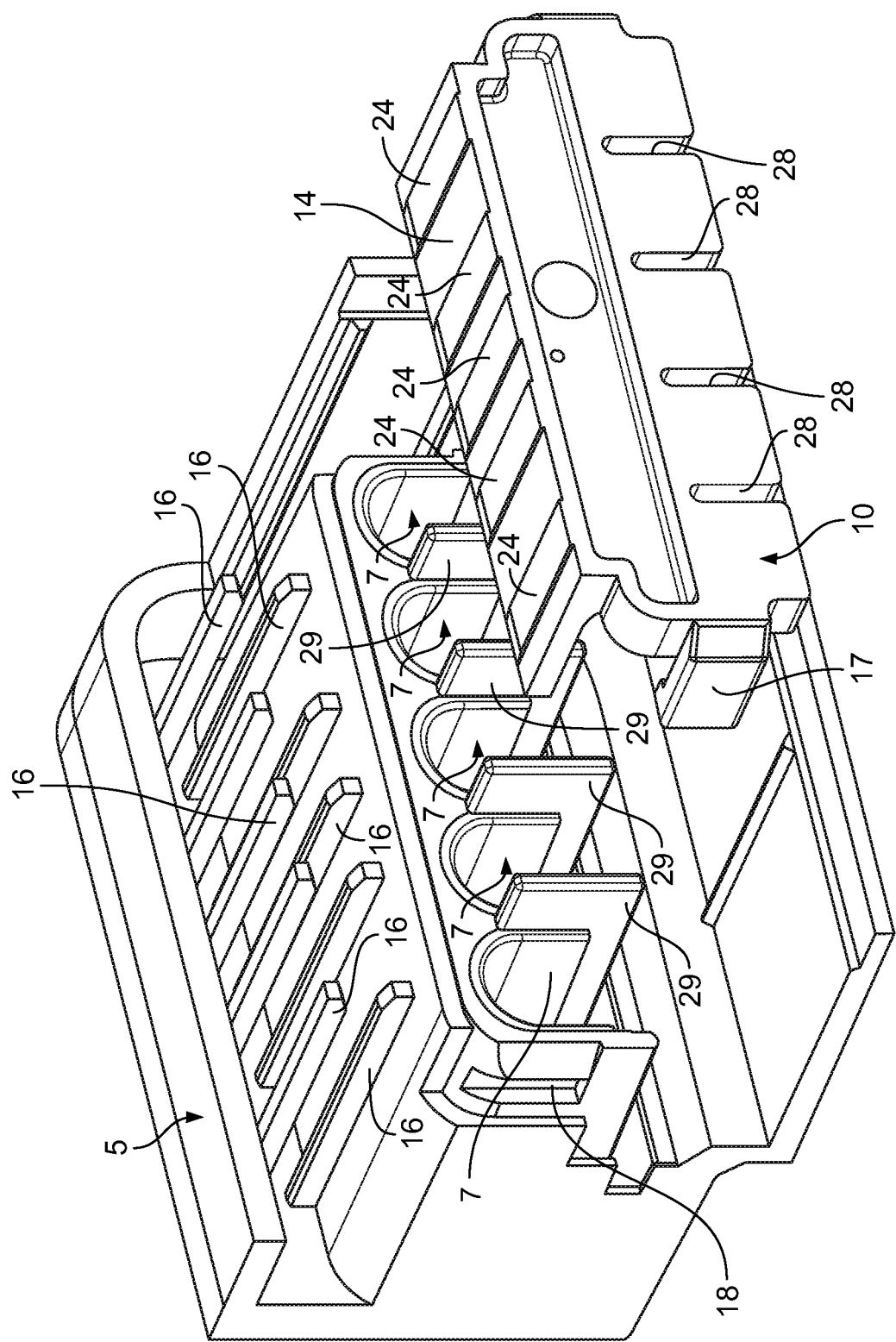
FIG. 14 is a perspective view of a first assembly step of the reflector element of FIG. 13 with other parts of the lighting device.
Figure 15:
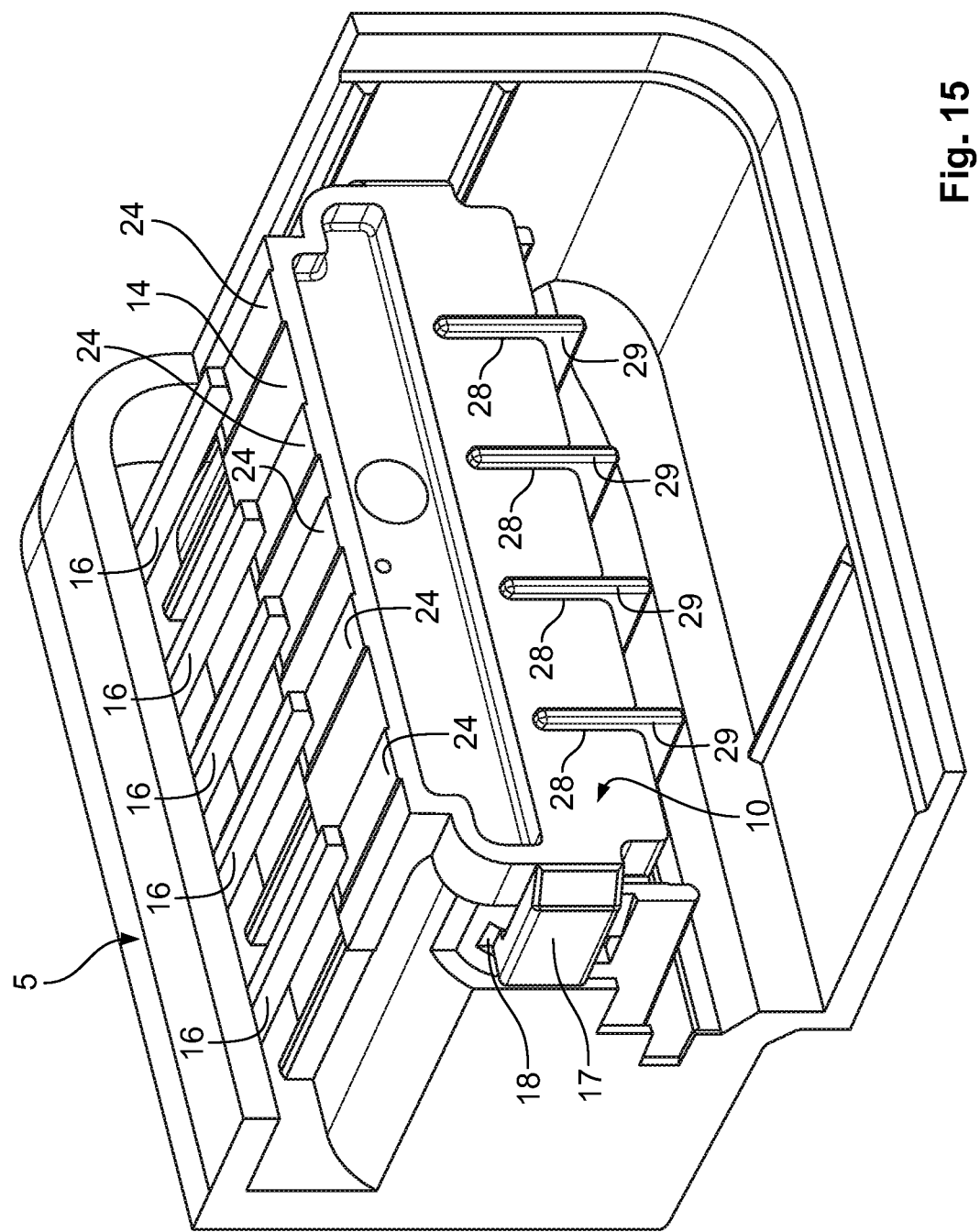
FIG. 15 is a perspective view of a second assembly step of the reflector element of FIG. 13 with other parts of the lighting device.

As described previously, the reflective surfaces 11, arranged on the principal plane of reflection 13 of the reflector element 10, are separated along the principal plane 13 by a plurality of partition walls 26 which, in the mounted state of the device D, are arranged in abutment against corresponding dividing walls 27 of the channel-shaped portions 7, as shown in FIGS. 10 and 11. Alternatively, as shown in FIGS. 13-15, the reflective surfaces 11 may be separated along the principal plane 13 by a plurality of vertical recesses 28. In this case, the channel-shaped portions 7 are divided from one another by corresponding vertical partition walls 29 which, in the mounted state of the device D, are coupled to the recesses 28, as shown in FIG. 15.

Below in the present description, the reflective surfaces 11 arranged along the principal plane of reflection 13 of the reflector element 10 will now be described in detail.

As stated above, the reflective surfaces 11 are arranged facing towards a corresponding channel-shaped portion 7, and are configured to direct and to improve the homogeneity of the light rays emitted from a light source 1 onto the corresponding lens 8. Indeed, without the setup of the reflector element 10 and the reflective surfaces 11, given the orientation of the lighting sources 1, the emission of the light radiation onto the lenses 8 would not be very effective, since it would create an inhomogeneous patch of light. In this connection, in a first embodiment shown in FIGS. 4-12, the reflective surfaces 11 have circular shape and a convex profile, protruding from the plane of reflection 13, and an inclination, with respect to the principal plane of reflection 13, in the direction of the principal plane of the printed circuit board 2 and of the sources 1.

Alternatively, in order to obtain a different reflection spectrum, each reflective surface 11 may include a central cavity 30, as shown in FIGS. 13 and 16-18.

Figure 16:
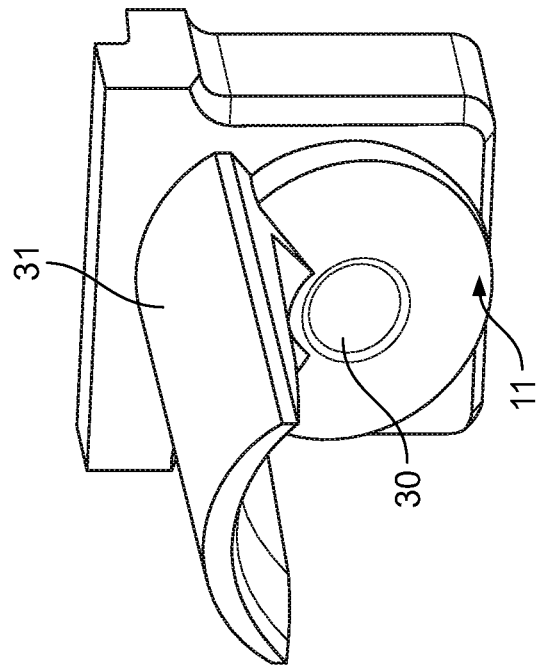
FIG. 16 is a perspective view of a portion of the reflector element according to an embodiment.

Alternatively, each reflective surface 11 may be associated with a cap 31, likewise of a material having reflective properties, which protrudes from the principal plane of reflection 13 in a direction substantially perpendicular thereto, as shown in FIG. 16.

Figure 17:
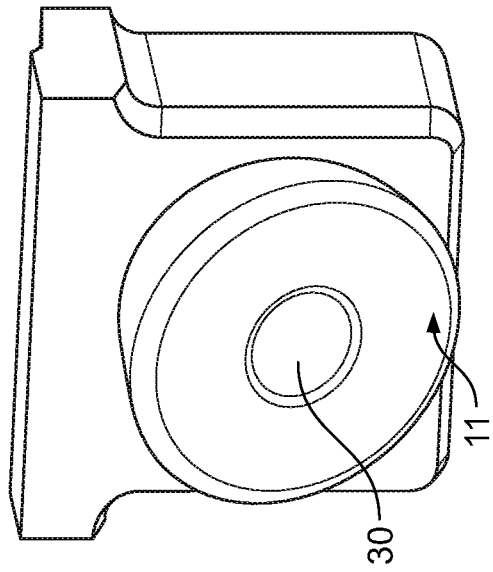
FIG. 17 is a perspective view of a portion of the reflector element according to an embodiment.
Figure 18:
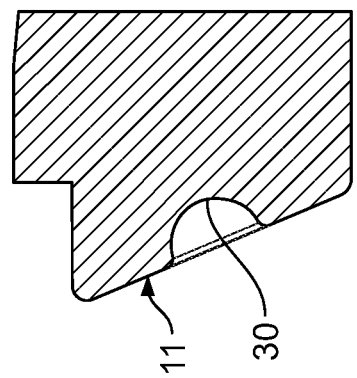
FIG. 18 is a sectional side view of the portion of the reflector element of FIG. 17.

Alternatively, the reflective surfaces 11 may have a flat front surface and an inclination with respect to the principal plane of reflection 13 in the direction of the plane of the printed circuit board 2 and of the sources 1, as shown in FIGS. 17 and 18.

Figure 20:
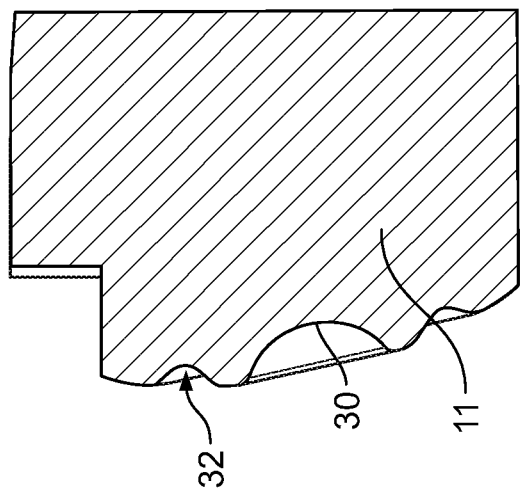
FIG. 20 is a sectional side view of the portion of the reflector element of FIG. 19.
Figure 19:
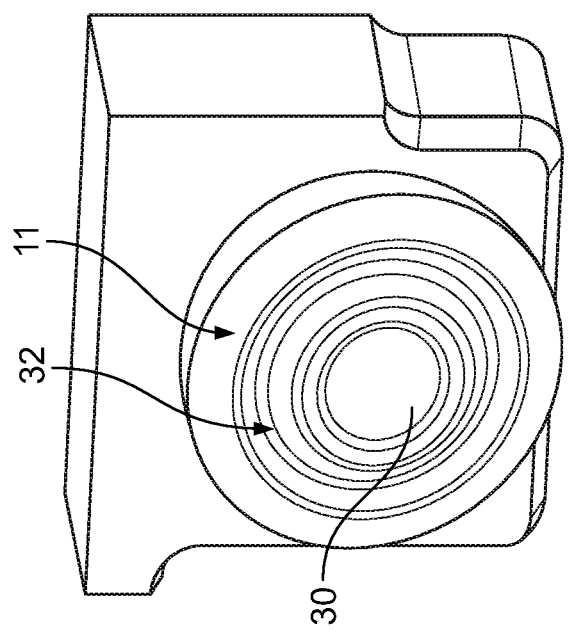
FIG. 19 is a perspective view of a portion of the reflector element according to another embodiment.

Alternatively, each reflective surface 11 may also have, in addition to the central cavity 30 described above, a wavy profile 32 in a portion which is peripheral with respect to the central cavity 30, as shown in FIGS. 19 and 20.

It will further be appreciated that features or particulars exemplified with reference to one of the drawings described above may also be transferred (individually or in combination with one another) to embodiments exemplified in other drawings.

One or more embodiments of the present invention may have one or more of the following benefits:
  the device D according to the invention makes it possible to direct effectively and to improve the homogeneity of the light radiation emitted from the lighting sources 1;
    the device D according to the invention has as a whole a structure which is simple in construction, compact and low in bulk, and which has low production costs;
    the device D according to the invention makes it possible to provide light indicators which are easily observable by a user.

As stated above, one or more embodiments may relate to a device D for indicating a charge state of a battery pack mounted on board a motor vehicle powered by an electric motor.

The present invention further relates to an assembly method for implementing a lighting device D, comprising the following steps:

providing a printed circuit board 2 having a main side 20 on which there are arranged side by side a plurality of electrically powered lighting sources 1, in particular solid-state lighting sources such as LED sources, oriented so as to project the emitted light radiation in a direction perpendicular to the plane of the printed circuit board 2, providing a first support body 4 configured to support said printed circuit board 2 in a horizontal direction, providing a second support body 5 including a seat 6 set up to receive an end 21 of the printed circuit board 2, a plurality of channel-shaped portions 7 arranged side by side extending in a direction substantially parallel to said horizontal direction, each having a first end 70 and a second, opposite end defined by a lens 8, set up to emit the light generated by a corresponding lighting source 1, wherein each channel-shaped portion 7 is configured to receive, in the proximity of said first end 70, a corresponding lighting source 1 mounted on the printed circuit board 2, and to convey the light radiation emitted from a lighting source 1 towards the corresponding lens 8, providing a reflector element 10 having a principal plane of reflection 13 on which there are arranged a plurality of reflective surfaces 11 arranged side by side, mechanically connecting said reflector element 10 by connecting members to said second support body 5, in such a way that said principal plane of reflection 13 is directed perpendicular to the principal direction of the channel-shaped portions 7 and covers the first ends 70 of the channel-shaped portions 7, joining said first support body 4 to the second support body 5 using a laser-welding technique, so as to form a single casing 3 of the device D.

Naturally, notwithstanding the principle behind the invention, the particulars of construction and the embodiments may vary widely from what is described and illustrated purely by way of example, without departing from the scope of the present invention as a result.

What is claimed is:

1. A lighting device using a plurality of electrically powered solid-state lighting sources, comprising:
    a printed circuit board having a main side on which the plurality of lighting sources are arranged side by side, the lighting sources are oriented so as to project an emitted light radiation in a direction perpendicular to the main side;
    a first support body supporting the printed circuit board in a horizontal direction;
    a second support body rigidly connected to the first support body to form a single casing, the second support body including:
        a seat receiving an end of the printed circuit board with the lighting sources arranged within the second support body; and
        a plurality of channel-shaped portions arranged side by side and extending in a direction substantially parallel to the horizontal direction, each channel-shaped portion having a first end facing towards the first support body and a second, opposite end defined by a lens, a plurality of lenses are arranged side by side at an outer surface of the single casing, each channel-shaped portion receives, in a proximity of the first end, one of the lighting sources mounted on the printed circuit board and conveys the emitted light radiation toward one of the lenses, the lens emitting the light radiation; and
    a reflector element rigidly connected by a plurality of connecting members to the second support body and arranged transversely along the first ends of the channel-shaped portions, the reflector element having a plurality of reflective surfaces arranged side by side, each of the reflective surfaces facing towards one of the channel-shaped portions and directing the emitted light radiation to one of the lenses.

2. The lighting device of claim 1, wherein the reflector element is formed in a single piece of plastic material.

3. The lighting device of claim 1, wherein the reflector element is white in color.

4. The lighting device of claim 1, wherein each of the channel-shaped portions has an internal surface covered with a transparent polycarbonate.

5. The lighting device of claim 1, wherein the lighting sources are each an LED source that emits a colored light radiation.

6. The lighting device of claim 1, wherein the reflector element has a principal plane of reflection having the plurality of reflective surfaces, the principal plane of reflection in the mounted state is directed perpendicular to a principal plane of the printed circuit board and to a principal direction in which the channel-shaped portions extend, to cover the first ends of the channel-shaped portions.

7. The lighting device of claim 6, wherein the plurality of reflective surfaces each have a circular shape and a convex profile at an inclination to the principal plane of reflection in the direction of the principal plane of the printed circuit board.

8. The lighting device of claim 6, wherein each of the reflective surfaces has a cap protruding from the principal plane of reflection in a direction substantially perpendicular to the principal plane of reflection.

9. The lighting device of claim 6, wherein each of the reflective surfaces has a circular shape with a flat front surface at an inclination to the principal plane of reflection in a direction of the lighting sources.

10. The lighting device of claim 1, wherein each of the reflective surfaces has a central cavity.

11. The lighting device of claim 10, wherein each of the reflective surfaces has a wavy profile.

12. The lighting device of claim 6, wherein the reflective surfaces are separated along the principal plane of reflection by a plurality of partition walls, the partition walls abut against a plurality of dividing walls of the channel-shaped portions in an assembled state of the reflector element on the second support body.

13. The lighting device of claim 12, wherein the light radiation emitted from one of the lighting sources arranged within one of the channel-shaped portions does not interfere with the light radiation emitted by another of the lighting sources arranged within an adjacent channel-shaped portion.

14. The lighting device of claim 6, wherein the reflective surfaces are separated along the principal plane of reflection by a plurality of vertical recesses, the channel-shaped portions are divided by a plurality of vertical partition walls, the vertical recesses are each paired with one of the vertical partition walls in an assembled state of the reflector element on the second support body.

15. The lighting device of claim 14, wherein the light radiation emitted from one of the lighting sources arranged within one of the channel-shaped portions does not interfere with the light radiation emitted by another of the lighting sources arranged within an adjacent channel-shaped portion.

16. The lighting device of claim 6, wherein the connecting members are defined by an upper portion of the reflector element that protrudes in a direction substantially perpendicular to the principal plane of reflection.

17. The lighting device of claim 16, wherein the upper portion has an opening coupled to a hook portion formed on the second support body in an upper position with respect to the channel-shaped portions, the reflector element hangs from the second support body and covers the first ends of the channel-shaped portions with the principal plane of reflection.

18. The lighting device of claim 16, wherein the upper portion has an upper surface with a plurality of ribs for mounting the upper portion in an interference fit within a hook portion formed on the second support body in an upper position with respect to the channel-shaped portions.

19. The lighting device of claim 16, wherein the connecting members include a pair of lateral hooks arranged on sides of the principal plane of reflection and coupling within a pair of lateral seats arranged on external sides of the channel-shaped portions.

20. The lighting device of claim 1, wherein the first support body has an input port for an electrical connector.

21. The lighting device of claim 1, wherein the first support body has a thickened part protruding from an external wall of the first support body in a direction perpendicular to the wall, the thickened part joined to a front surface of the second support body using a laser-welding technique to form the single casing, all the components of the lighting device are arranged in an interior of the single casing.

22. A device for indicating a charge state of a battery pack mounted on board a motor vehicle powered by an electric motor, comprising:
   a lighting device using a plurality of electrically powered solid-state lighting sources, the lighting device including:
      a printed circuit board having a main side on which the plurality of lighting sources are arranged side by side, the lighting sources are oriented so as to project an emitted light radiation in a direction perpendicular to the main side;
      a first support body supporting the printed circuit board in a horizontal direction;
      a second support body rigidly connected to the first support body to form a single casing, the second support body including:
         a seat receiving an end of the printed circuit board with the lighting sources arranged within the second support body; and
         a plurality of channel-shaped portions arranged side by side and extending in a direction substantially parallel to the horizontal direction, each channel-shaped portion having a first end facing towards the first support body and a second, opposite end defined by a lens, a plurality of lenses are arranged side by side at an outer surface of the single casing, each channel-shaped portion receives, in a proximity of the first end, one of the lighting sources mounted on the printed circuit board and conveys the emitted light radiation toward one of the lenses, the lens emitting the light radiation; and
      a reflector element rigidly connected by a plurality of connecting members to the second support body and arranged transversely along the first ends of the channel-shaped portions, the reflector element having a plurality of reflective surfaces arranged side by side, each of the reflective surfaces facing towards one of the channel-shaped portions and directing the emitted light radiation to one of the lenses.

23. A method for assembling a lighting device, comprising:
   providing a printed circuit board having a main side on which a plurality of electrically powered solid-state lighting sources are arranged side by side, the lighting sources are oriented so as to project an emitted light radiation in a direction perpendicular to a plane of the printed circuit board;
   providing a first support body supporting the printed circuit board in a horizontal direction;
   fixing the printed circuit board within the first support body;
   providing a second support body including a seat receiving an end of the printed circuit board and a plurality of channel-shaped portions arranged side by side extending in a direction substantially parallel to the horizontal direction, each of the channel-shaped portions having a first end and a second, opposite end defined by a lens, each channel-shaped portion receives one of the lighting sources in a proximity of the first end and conveys the emitted light radiation toward one of the lenses, the lens emitting the light generated by the one of the lighting sources;
   providing a reflector element having a principal plane of reflection on which a plurality of reflective surfaces are arranged side by side;
   mechanically connecting the reflector element by a plurality of connecting members to the second support body, the principal plane of reflection is directed perpendicular to a principal direction of the channel-shaped portions and covers the first end of the channel-shaped portions; and
   joining the first support body to the second support body using a laser-welding technique to form a single casing.

24. The method of claim 23, wherein the mechanically connecting step includes:
   hooking an upper portion of the reflector element to a hook portion on the second support body, the reflector element hangs from the second support body;
   rotating the reflector element in a direction of the channel-shaped portions until the principal plane of reflection covers the first ends of the channel-shaped portions; and
   hooking a pair of lateral hooks arranged on sides of the principal plane of reflection to a pair of lateral seats arranged on external sides of the channel-shaped portions.

* * * * *